United States Patent [19]
Peterson et al.

[11] Patent Number: 5,350,200
[45] Date of Patent: Sep. 27, 1994

[54] TUBE COUPLING ASSEMBLY

[75] Inventors: Ivan H. Peterson; James S. Hoelle, both of Hamilton, Ohio; Thomas G. Wakeman, Laurenceburg, Ind.

[73] Assignee: General Electric Company, Cincinnati, Ohio

[21] Appl. No.: 179,174

[22] Filed: Jan. 10, 1994

[51] Int. Cl.⁵ .............................................. F16L 55/00
[52] U.S. Cl. ...................................... 285/92; 285/330; 285/334.4; 285/353
[58] Field of Search .................... 285/334.4, 92, 328, 285/353, 39, 330

[56] References Cited

U.S. PATENT DOCUMENTS

| | | | |
|---|---|---|---|
| 774,362 | 11/1904 | McCarthy | 285/261 |
| 1,977,241 | 10/1934 | Parker | 285/263 |
| 2,443,394 | 6/1948 | LeClair | 285/82 |
| 4,616,856 | 10/1986 | Kowalyshen | 285/92 |
| 4,801,160 | 1/1989 | Barrington | 285/334 X |
| 4,867,483 | 9/1989 | Witt et al. | 285/353 X |
| 5,058,930 | 10/1991 | Schlosser | 285/92 |
| 5,066,051 | 11/1991 | Weigl et al. | 285/334 X |
| 5,083,819 | 1/1992 | Bynum | 285/92 X |
| 5,145,219 | 9/1992 | Babuder | 285/353 X |
| 5,172,939 | 12/1992 | Hashimoto | 285/334.4 X |
| 5,263,312 | 11/1993 | Walker et al. | 60/39.31 |

FOREIGN PATENT DOCUMENTS 2045376  10/1980  United Kingdom ............. 285/334.4

Primary Examiner—Dave W. Arola
Attorney, Agent, or Firm—Jerome C. Squillaro; John R. Rafter

[57] ABSTRACT

A tube coupling assembly for use in connecting first and second fluid-carrying tubes comprising an annular sleeve member and an annular ferrule which are operably affixable to respective ones of the tubes. A tube connector and a coupling nut threadingly engage one another so as to force first and second spherical surfaces of the sleeve member against generally frusto-conical surfaces of the ferrule and coupling nut respectively, thereby forming a fluid sealing means and accommodating angular misalignment between the tubes. An internal locking means is provided for preventing the disengagement of the sealing means. The coupling nut and tube connector each include wrenching surfaces which must be used to torque the assembly, with the applied torque and counter-torque avoiding torsional loading of the tubes.

4 Claims, 2 Drawing Sheets

TUBE COUPLING ASSEMBLY

BACKGROUND OF THE INVENTION

1. Field of the Invention

The present invention relates generally to gas turbine engines and, more particularly, to a tube coupling assembly for use in connecting fluid tubing of gas turbine engines.

2. Related Art

Gas turbine engines such as those used for aircraft propulsion necessarily include external tubing systems for delivering fluids, either gases or liquids, from one engine component to another or for connecting an engine component with an aircraft system. These tubing systems may include tube coupling assemblies, of various types, to connect adjacent fluid-carrying tubes or to connect a tube to another engine component.

One prior tube coupling assembly which has been used in gas turbine engine tubing systems is the B-nut, or ballnose fitting, assembly which comprises a tube connector having a first end operably affixable to a first fluid-carrying tube, a ferrule having a first end operably affixable to a second fluid-carrying tube, and a coupling nut having internal threads which engage external threads of the tube connector so as to urge the second ends of the tube connector and ferrule against one another in sealing engagement. Although the B-nut assembly has been advantageously used in a variety of gas turbine engine applications, it is subject to certain limitations. Since the tube connector may not rotate due to a fixed attachment to a fluid-carrying tube, the assembler is not forced to use a pair of wrenches to tighten the fittings. Instead, the assembly fittings may be tightened by using a single wrench to apply a torque to the wrenching surface of the rotatable coupling nut. If a second wrench is not used to apply a counter torque to the wrenching surface of the tube connector a torsional load is imposed on the fluid-carrying tube to which the tube connector is attached. This torsional load may result in failure of the fluid-carrying tube. Additionally, current B-nut assemblies have no means for accommodating angular misalignment between the fluid-carrying tubes being connected. If the tubes are forced into alignment at assembly a resultant bending load is reacted by the tubes which may lead to tube distress.

The coupling nut of the B-nut assembly typically includes drilled holes for allowing the nut to be safety-wired to another engine component to prevent loosening of the assembly fittings, i.e., to prevent the coupling nut from backing off of the tube connector by an amount which eliminates the tube connector/ferrule contact seal. However, the safety wires is difficult to install and if installed incorrectly can actually facilitate loosening of the assembly fittings so as to eliminate the contact seal.

Other tube fitting or coupling assemblies are known which include self locking features. An example of such an assembly is illustrated in U.S. Pat. No. 5,263,312 to Walker, et al. entitled "Tube Fitting For A Gas Turbine Engine," issued Nov. 23, 1993 and assigned to the assignee of the present invention, which illustrates a plurality of resilient figures 71 which engage a plurality of slots 63 in the outer circumferential surface 65 of B-nut 19. While the aforementioned locking feature scheme employing fingers 71 and slots 63 avoids the potential problems associated with safety-wiring the B-nut, and may be advantageously utilized, the external nature of the locking feature causes it to be susceptible to handling and operational damage. Another fitting assembly is known which also uses externally configured fingers and slots with the number of fingers being different than the number of slots, wherein this difference may be used to control the allowable rotational slip of the assembly between possible locked conditions. Other self-locking tube coupling assemblies are known which require additional parts such as springs or sawtooth washers wherein these parts increase assembly cost and decrease assembly reliability.

In view of the foregoing, prior to the present invention a need existed for an improved tube coupling assembly for use in fluid tubing systems to resolve the aforementioned problems associated with prior coupling, or fitting, assemblies.

SUMMARY OF THE INVENTION

The present invention is directed to a tube coupling assembly for use in connecting first and second fluid-carrying tubes. According to a preferred embodiment of the present invention, the tube coupling assembly comprises an annular sleeve member and an annular ferrule, each having a cylindrical bore. The sleeve member and the ferrule are operably affixable to the first and second fluid-carrying tubes, respectively. The cylindrical bore of the sleeve member is disposed relative to the cylindrical bore of the ferrule so as to define a passage means for providing flow communication between the first and second fluid-carrying tubes. The assembly still further comprises: a coupling nut which includes a flange portion, a barrel portion protruding axially from the flange portion and a generally frusto-conical surface formed between the flange portion and the barrel portion; and a tube connector which includes a flange portion and a barrel portion protruding axially from the flange portion. The coupling nut and the tube connector threadingly engage one another so as to force a first spherical surface of the sleeve member against a generally frusto-conical surface of the ferrule and to force a second spherical of the sleeve member against the generally frusto-conical surface of the coupling nut. The first spherical surface and the generally frusto-conical surface of the ferrule engage on another so as to form a sealing means for preventing fluid from escaping from the passage means. The first and second spherical surfaces combine with the generally frusto-conical surfaces of the ferrule and the coupling nut, respectively, to accommodate angular misalignment between the first and second fluid-carrying tubes.

Another preferred embodiment in accordance with the present invention includes the following additional structural features and functions. The tube coupling assembly further comprises an internal locking means for preventing the first spherical surface of the sleeve member from disengaging the generally frusto-conical surface of the ferrule. The internal locking means comprises a plurality of circumferentially spaced and axially extending resilient fingers protruding form the barrel portion of the tube connector and a plurality of circumferentially spaced and axially extending grooves formed in the barrel portion of the coupling nut. The grooves comprise a portion of a radially inner surface of the barrel portion of the coupling nut and each of the fingers include a radially outwardly extending tip portion. The fingers and the grooves are disposed relative to one another such that at least one of the fingers releasably interlockingly engages one of the grooves with the corresponding one of the tip portions being positioned within the groove. The number of grooves is different than the number of fingers. The barrel portion of the coupling nut includes internal threads and the grooves are disposed axially between the internal threads and the generally frusto-conical surface of the coupling nut. The barrel portion of the tube connector includes external threads which engage the internal threads of the coupling nut. The external threads are disposed axially between the fingers and the flange portion of the tube connector. The flange portions of the coupling nut and the tube connector each include a hexagonally shaped external wrenching surface.

BRIEF DESCRIPTION OF THE DRAWINGS

The structural features and functions of the present invention, as well as the advantages derived therefrom, will become apparent from the subsequent detailed description of the preferred embodiments when taken in conjunction with the accompanying drawings in which.

DETAILED DESCRIPTION

Figure 1:
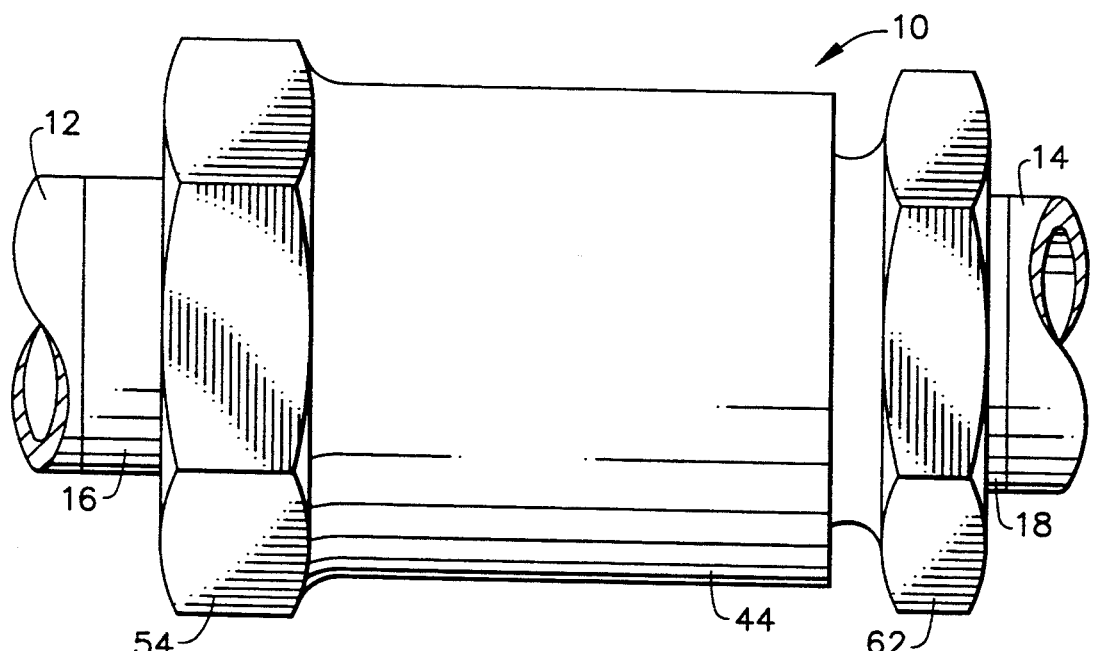
FIG. 1 is an external longitudinal view illustrating the tube coupling assembly of the present invention.
Figure 2:
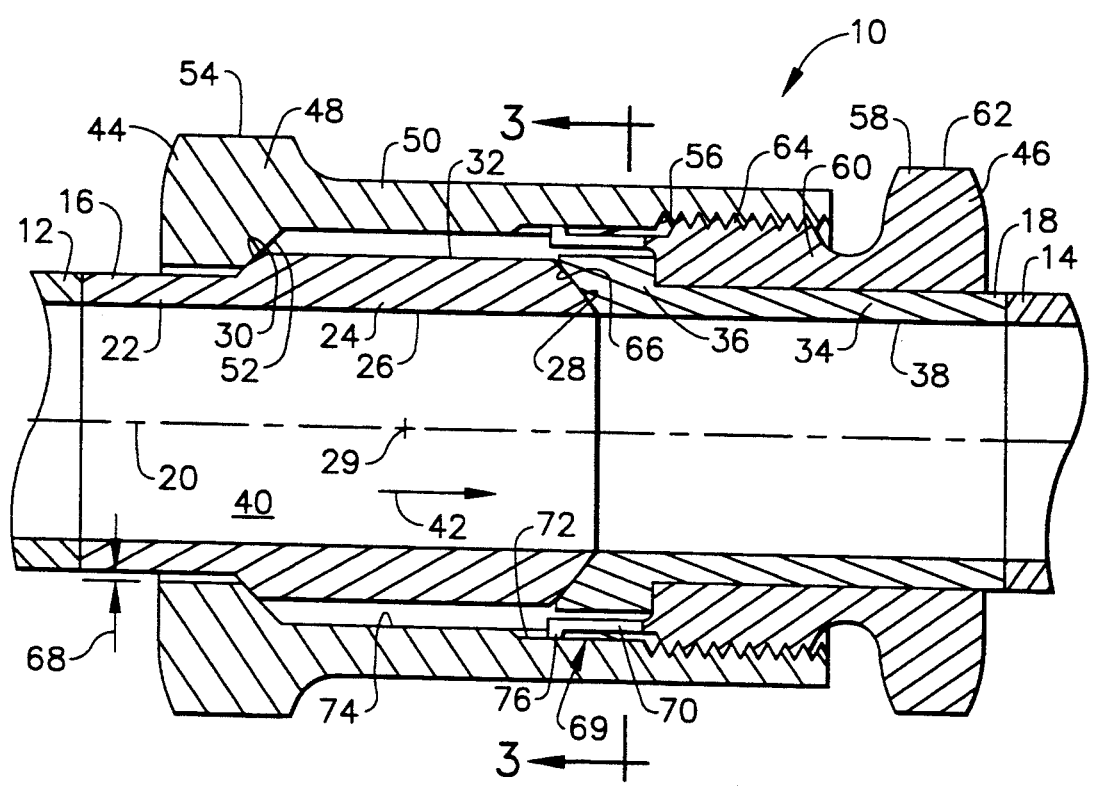
FIG. 2 is a longitudinal cross section illustrating the tube coupling assembly of the present invention.
Figure 3:
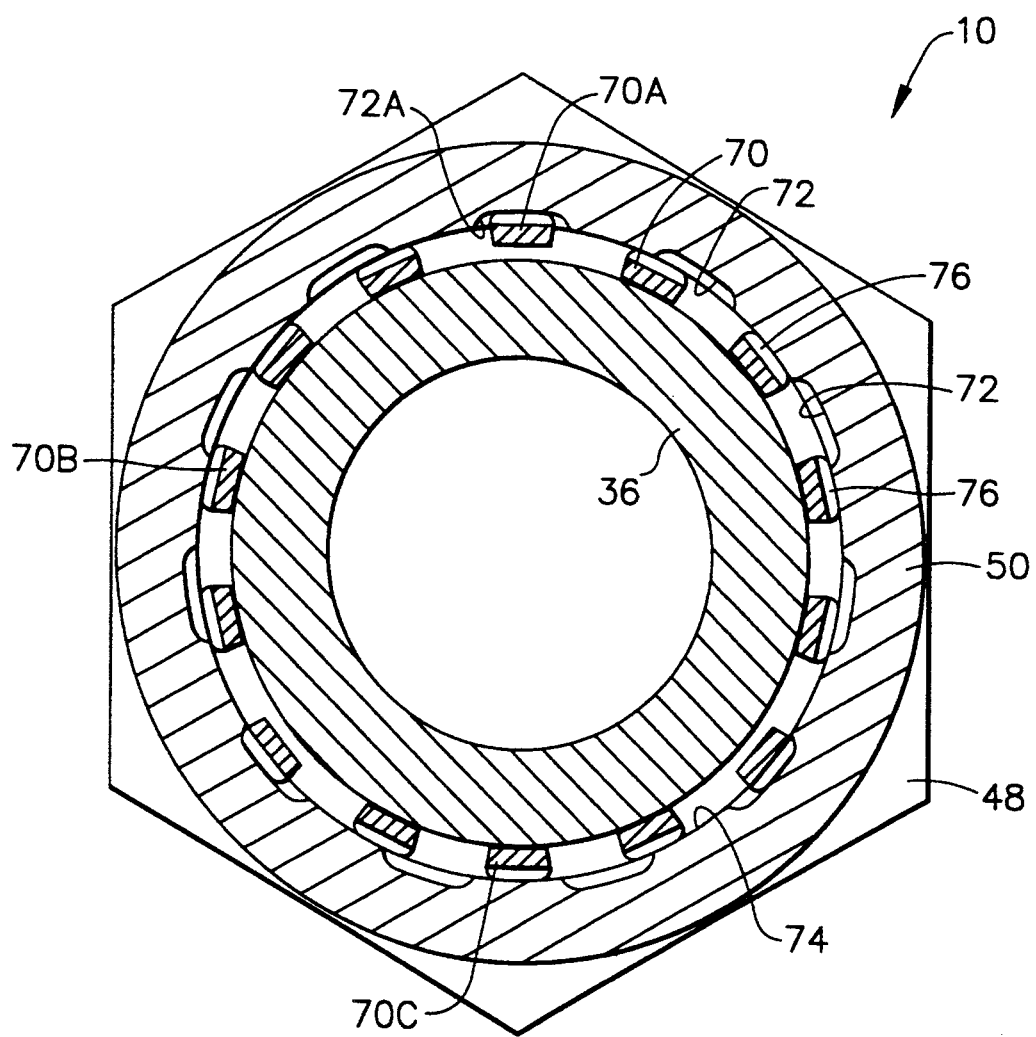
FIG. 3 is a view taken along line 3—3 in FIG. 2, further illustrating the locking means of the tube coupling assembly illustrating in FIG. 2.

Referring now to the drawings, wherein like reference numerals have been used for similar elements throughout, FIGS. 1–3 illustrate the tube coupling assembly 10 of the present invention. Tube coupling assembly 10 is used to fluidly connect first and second fluid-carrying tubes 12 and 14, respectively. In a preferred embodiment tubes 12 and 14 are part of an external tubing system of a gas turbine engine (not shown) and tubes 12 and 14 may be used to transport either liquids or gases. However, it should be understood that tube coupling assembly 10 may be used to fluidly connect tubes which are used in systems other than those utilized by gas turbine engines.

Tube coupling assembly 10 comprises an annular sleeve member 16 and an annular ferrule 18 which are each disposed about an axially extending longitudinal centerline 20 of assembly 10. Sleeve member 16 includes a first portion 22 which is cylindrical, a second portion 24 attached to first portion 22, and a cylindrical bore 26 extending through first and second portions 22 and 24, respectively. First portion 22 of sleeve member 16 is operably affixable to first fluid-carrying tube 12. Second portion 24 of sleeve member 16 includes first and second spherical surfaces 28 and 30, respectively, which are utilized for subsequently described purposes, and a cylindrical outer surface 32 which extends between first spherical surface 28 and second spherical surface 30. First spherical surface 28 and second spherical surface 30 are defined by a common radius originating from the geometric center 29 of second portion 24 of sleeve member 16. Ferrule 18 includes a first, cylindrical portion 34 and a second, flared portion 36 which is attached to cylindrical portion 34. Cylindrical portion 34 of ferrule 18 is operably affixable to second fluid-carrying tube 14. In a preferred embodiment first portion 22 of sleeve member 16 and cylindrical portion 34 of ferrule 18 are butt-welded to tubes 12 and 14, respectively. Cylindrical bore 26 of sleeve member 16 is disposed relative to cylindrical bore 38 of ferrule 18 so as to define a passage means 40 for providing flow communication between first and second fluid-carrying tubes 12 and 14, respectively. As illustrated in FIG. 2, fluid flow 42 flows from first tube 12 through passage means 40 to second tube 14. However, it should be understood that the tube connector assembly 10 is also suitable for accommodating fluid flow from second tube 14 to first tube 12 since assembly 10 is not flow-direction sensitive.

Tube coupling assembly 10 further comprises an annular coupling nut 44 which is disposed in surrounding relationship with sleeve member 16 and a tube connector 46 which is disposed in surrounding relationship with ferrule 18. Coupling nut 44 includes a flange portion 48, a barrel portion 50 which is attached to and protrudes axially from flange portion 48, and a generally frusto-conical surface 52 which is formed between flange portion 48 and barrel portion 50. Flange portion 48 has an external wrenching surface 54 which is hexagonally shaped and internal threads 56 are formed in barrel portion 50. Tube connector 46 includes a flange portion 58 and a barrel portion 60 which is attached to and protrudes axially from flange portion 58. Flange portion 58 has an external wrenching surface 62 which is hexagonally shaped and external threads 64 are formed in barrel portion 60. Barrel portion 50 of coupling nut 44 is disposed in surrounding relationship with barrel portion 60 of tube connector 46.

Coupling nut 44 and tube connector 46 threadingly engage one another, via engagement of external threads 64 with internal threads 56, so as to force barrel portion 60 of tube connector 46 against flared portion 36 of ferrule 18 and so as to force the generally frusto-conical surface 52 of coupling nut 44 against the second spherical surface 30 of sleeve member 16. Consequently, coupling nut 44 and tube connector 46 threadingly engage one another so as to exert an axial load which forces the first spherical surface 28 of sleeve member 16 against a generally frusto-conical surface 66 of ferrule 18. First spherical surface 28 and generally frusto-conical surface 66 engages one another to form a sealing means comprising a contact seal for preventing fluid 42 from escaping passage means 40. First and second spherical surfaces 28 and 30, respectively, of sleeve member 16 combine with the generally frusto-conical surfaces 66 and 52, of ferrule 18 and coupling nut 44 respectively, to accommodate angular misalignment between first fluid-carrying tube 12 and second fluid-carrying tube 14. The manner in which this angular misalignment accommodation is achieved may be further explained as follows. FIG. 2 illustrates first and second fluid-carrying tubes 12 and 14,respectively, in a generally aligned condition. Consequently, sleeve member 16 and ferrule 18 are also generally aligned and coupling nut 44 is generally concentric with sleeve member 16 as illustrated in FIG. 2. However, the engagement of second spherical surface 30 of sleeve member 16 with the generally frusto-conical surface 50 of coupling nut 44 allows coupling nut 44 to pivot relative to sleeve member 16 of such that coupling nut 44 is not concentric with sleeve member 16 in order to position coupling nut 44 in the required concentric relationship with tube connector 46 to accommodate angular misalignment between tubes 12 and 14. The engagement of first spherical surface 28 of sleeve member 16 with the generally frusto-conical surface 66 of ferrule 18 allows ferrule 18 to be angularly disposed relative to sleeve member 16 while maintaining a contact seal between surfaces 28 and 66 to accommodate angular misalignment between tubes 12 and 14. Consequently, both spherical surfaces 28 and 30 and the mating generally frusto-conical surfaces 66 and 50, respectively, are required to accommodate angular misalignment between tubes 12 and 14. The amount of angular misalignment between tubes 12 and 14 which may be accommodated may be determined by sizing the radial clearance 68 between flange portion 48 of coupling nut 44 and first portion 22 of sleeve member 16. It should be understood that the phrase "angularly disposed," as applied to the position of ferrule 18 relative to sleeve member 16, refers to a condition where the individual centerlines of ferrule 18 and sleeve member 16, which together form assembly centerline 20, are angled relative to one another and does not refer to the relative angular, or clocked, positions of ferrule 18and sleeve member 16 about assembly centerline 20. Similarly, it should be understood that the phrase "angular misalignment," as applied to the relative positions of tubes 12 and 14, refers to a condition where the individual centerlines of tubes 12 and 14 are angled relative to one another.

Prior to the threading engagement of coupling nut 44 with tube connector 46, coupling nut 44 is free to rotate relative to sleeve member 16 and the tube connector 46 is free to rotate relative to ferrule 18. Therefore, the assembler is required to apply a pair of conventional wrenches simultaneously to wrenching surface 54 of flange portion 48 of coupling nut 44 and wrenching surface 62 of flange portion 58 of tube connector 46 to tighten tube coupling assembly 10. Consequently, tubes 12 and 14 are not torsionally loaded during the torquing of coupling nut 44 and tube connector 46.

Tube coupling assembly 10 further comprises an internal locking means 69, for preventing the first spherical surface 28of sleeve member 16 from disengaging the generally frusto-conical surface 66 of ferrule 18. Internal locking means 69 comprises a plurality of circumferentially spaced and axially extending resilient fingers 70 which are attached to and protrude from the barrel portion 60 of tube connector 46 and a plurality of circumferentially spaced and axially extending grooves 72 formed in the barrel portion 50 of coupling nut 44. Grooves 72 comprise a portion of a radially inner surface 74 of the barrel portion 50 of coupling nut 44 and grooves 72 are disposed axially between internal threads 64 and the generally frusto-conical surface 52 of coupling nut 44. Fingers 70 protrude from barrel portion 60 of tube connector 46 such that external threads 64 are disposed axially between fingers 70 and flange portion 58 of tube connector 46. Each of the fingers 70 includes a radially outwardly extending tip portion 76. Fingers 70 and grooves 72 are disposed axially and radially relative to one another so that at least one of the tip portions 76 is positioned within one of grooves 72 as illustrated by the relative position of finger 70A and groove 72A in FIG. 3 so that finger 70a and groove 72A are releasably interlocked. Others of fingers 70 may be partially engaged with one of the grooves 72, as illustrated by finger 70B, while still others of fingers 70 may not be engaged with any of the grooves 72, as illustrated by finger 70C in FIG. 3. The resilient nature of fingers 70 coupled with the rounded circumferentially facing ends of tip portions 76 of fingers 70 and of grooves 72 allows fingers 70 to disengage grooves 72 as required during the process of threadingly engaging coupling nut 44 and tube connector 46 with one another. In a preferred embodiment the number, or quantity, of fingers 70 is different than the number, or quantity, of grooves 72 by a quantity of one. However, it should be understood that other relationships between the number of fingers 70 and grooves 72, such as that illustrated in FIG. 3, are envisioned by the inventors to be within the scope of the present invention wherein the number of fingers 70 and grooves 72 differ by more than one. The ratio of the number of fingers 70 and grooves 72 may be selected based on consideration of the nominal thread size of coupling nut 44 and tube connector 46 and the required torque to tighten nut 44 and connector 46.

As an example of a preferred embodiment, the inventors have found it advantageous to utilize eighteen of fingers 70 and nineteen of grooves 72 in conjunction with a coupling nut 44 and a tube connector 46 having nominal thread diameters of one inch, requiring 900–1100 in.-lbs. of seating torque to provide the desired axial load for forcing first spherical surface 28 of sleeve member 16 against the generally frusto-conical surface 66 of ferrule 18. With the given example, only one of the resilient fingers 70 is positioned within one of the grooves 72, in a releasable interlocking engagement, for any relative position of coupling nut 44 and tube connector 46 about centerline 20. This provides a consistent free running torque during the torquing of nut 44 and connector 46 and further provides a relatively low free running torque relative to an assembly having multiple fingers and grooves engaged simultaneously. Further, with the given example it may be appreciated that the incremental relative rotation which may occur between coupling nut 44 and tube connector 46 corresponding to circumferentially adjacent releasable interlocking positions, which are separately achievable, is approximately one degree based on the differential angular spacing between fingers 70 and grooves 72 (which may be calculated to be 20°−18.95°). Consequently, with the relatively small incremental rotation of approximately one degree between circumferentially adjacent releasable interlocking positions which may be achieved, tube coupling assembly 10 may be releasably interlocked while maintaining the seating torque of coupling nut 44 and tube connector 46 within an acceptable range.

In a preferred embodiment tube coupling assembly 10 is assembled as follows. Coupling nut 44 and tube connector 46 are slid over the ends of first and second fluid-carrying tubes 12 and 14, respectively. Sleeve member 16 and ferrule 18 are then butt-welded to tubes 12 and 14, respectively. Coupling nut 44 is then disposed relative to sleeve member 16, which may require coupling nut 44 to be pivoted relative to sleeve member 16, so that coupling nut 44 is concentrically aligned with tube connector 46. Coupling nut 44 and tube connector 46 are then threadingly engaged by simultaneously applying conventional wrenches to external wrenching surfaces 54 and 62. Tube coupling assembly 10 is torqued until first spherical surface 28 of sleeve member 16 is seated against the generally frusto-conical surface 66 of ferrule 18 and the seating torque is within an acceptable range. If necessary, coupling nut 44 and tube connector 46 are further rotated relative to one another by a small incremental amount to ensure that one of fingers 70 and one of grooves 72 are releasably interlocked with one another. In a preferred embodiment sleeve member 16, ferrule 18, coupling nut 44 and tube connector 46 are each made of a material such as Inconel 625 or stainless steel 321. However, it should be understood that other materials suitable for use in gas turbine engines may be used and further that other materials may be used which are suitable for applications other than tubing systems of gas turbine engines.

In operation tube coupling assembly 10 fluidly connects first fluid-carrying tube 12 with second fluid-carrying tube 14, wherein tubes 12 and 14 may be used to transport either liquids or gases. The contact engagement of first spherical surface 28 of sleeve member 16 with the generally frusto-conical surface 66 of ferrule 18 prevents fluid 42 from escaping passage means 40.

In conclusion, tube coupling assembly 10 includes the following advantageous structural features and functions. Sleeve member 16 and ferrule 18 are operably affixable to first and second fluid-carrying tubes 12 and 14, respectively, with cylindrical bore 26 of sleeve member 16 and cylindrical bore 38 of ferrule 18 disposed relative to one another so as to define passage means 40 for providing flow communication between tubes 12 and 14. The engagement of first and second spherical surfaces 28 and 30, respectively, of sleeve member 16 with the corresponding mating generally frusto-conical surfaces 66 and 52 of ferrule 18 and coupling nut 44, respectively, allows tube coupling assembly 10 to provide a sealing means for preventing fluid 42 from escaping passage means 40 while accommodating angular misalignment between tubes 12 and 14. The requirement to apply a pair of wrenches simultaneously to wrenching surface 54 of coupling nut 44 and wrenching surface 62 of tube connector 46, in order to tighten assembly 10 by threadingly engaging nut 44 and connector 46, avoids torsionally loading tubes 12 and 14. The internal nature of locking means 69 reduces the potential of handling and operational damage to locking means 69 relative to coupling assemblies having an external locking means. Tube coupling assembly 10 may be releasably interlocked by positioning at least one of fingers 70 within one of grooves 72. The fact that the number of fingers 70 is one more or less than the number of grooves 72 in a preferred embodiment allows tube coupling assembly 10 to be disposed in a first releasable interlocking position and subsequently disposed in a second releasable interlocking position due to a relatively small incremental rotation of coupling nut 44 relative to tube connector 46 about centerline 20.

While the foregoing description has set forth the preferred embodiments of the invention in particular detail, it must be understood that numerous modifications, substitutions and changes can be undertaken without departing from the true spirit and scope of the present invention as defined by the ensuing claims. The protection desired to be secured by Letters Patent of the United States for this invention is defined by the subject matter of the following claims.

What is claimed is:

1. A tube coupling assembly for use in connecting first and second fluid-carrying tubes, said tube coupling assembly comprising:
   a) an annular sleeve member having a cylindrical bore, said sleeve member being operably affixable to said first fluid-carrying tube;
   b) an annular ferrule having a cylindrical bore, said ferrule being operably affixable to said second fluid-carrying tube, wherein said cylindrical bore of said sleeve member is disposed relative to said cylindrical bore of said ferrule so as to define a passage means for providing flow communication between said first and second fluid-carrying tubes;

2. A tube coupling assembly as recited in claim 1, wherein the number of said grooves is different than the number of said fingers.

3. A tube coupling assembly as recited in claim 2, wherein
   a) said barrel portion of said coupling nut includes internal threads and said grooves are disposed axially between said internal threads and said generally frusto-conical surface of said coupling nut;
   b) said barrel portion of said tube connector includes external threads which engage said internal threads of said coupling nut, said external threads being disposed axially between said fingers and said flange portion of said tube connector.

4. A tube coupling assembly as recited in claim 3, wherein said flange portions of said coupling nut and said tube connector include an external wrenching surface, each of said external wrenching surfaces being hexagonally shaped.

c) a coupling nut including a flange portion, a barrel portion protruding axially from said flange portion, and a generally frusto-conical surface formed between said flange portion and said barrel portion; and
   d) a tube connector including a flange portion and a barrel portion protruding axially from said flange portion;
   e) wherein said coupling nut and said tube connector threadingly engage one another so as to force a first spherical surface of said sleeve member against a generally frusto-conical surface of said ferrule and to force a second spherical surface of said sleeve member against said generally frusto-conical surface of said coupling nut, said first spherical surface and said generally frusto-conical surface of said ferrule engaging one another so as to form a sealing means for preventing fluid from escaping said passage means, said first and second spherical surfaces combining with said generally frusto-conical surfaces of said ferrule and said coupling nut, respectively, to accommodate angular misalignment between said first and second fluid-carrying tubes;
   f) an internal locking means for preventing said first spherical surface from disengaging said generally frusto-conical surface of said ferrule;
   g) said internal locking means comprises a plurality of circumferentially spaced and axially extending resilient fingers protruding from said barrel portion of said ferrule and a plurality of circumferentially spaced and axially extending grooves formed in said barrel portion of said coupling nut;
   h) said grooves comprise a portion of a radially inner surface of said barrel portion of said coupling nut and each of said fingers include a radially outwardly extending tip portion, said fingers and said grooves are disposed relative to one another such that at least one of said fingers releasably interlockingly engages one of said grooves with the corresponding one of said tip portions being positioned within said one of said grooves.

* * * * *